W. H. SINGLETON.
PNEUMATIC WATER SYSTEM.
APPLICATION FILED MAY 13, 1913.
1,097,143.
Patented May 19, 1914.
3 SHEETS—SHEET 2.
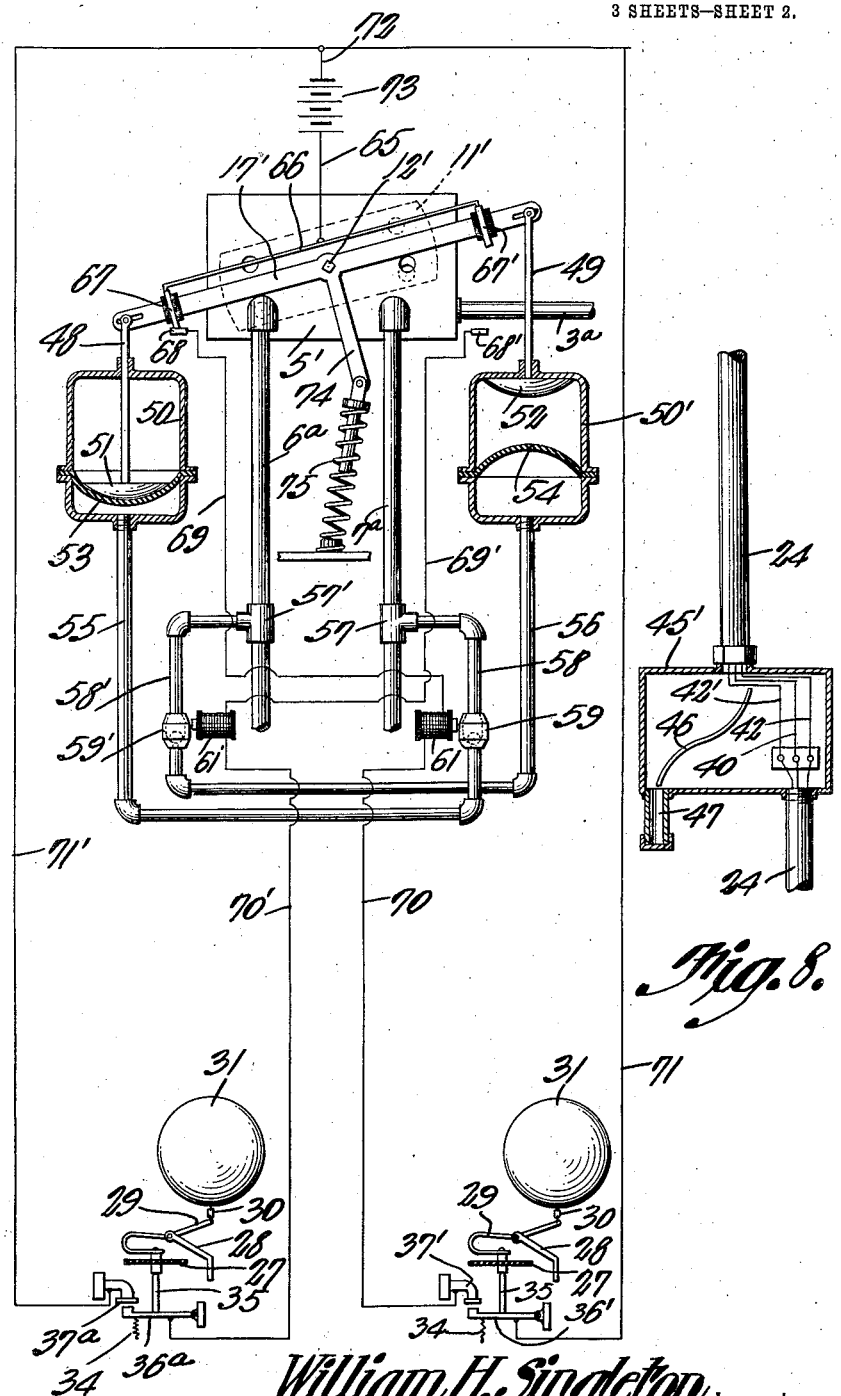
Witnesses
William H. Singleton, Inventor
by C. A. Snow & Co.
Attorneys W. H. SINGLETON.
PNEUMATIC WATER SYSTEM.
APPLICATION FILED MAY 13, 1913.
1,097,143.
Patented May 19, 1914.
3 SHEETS—SHEET 3.
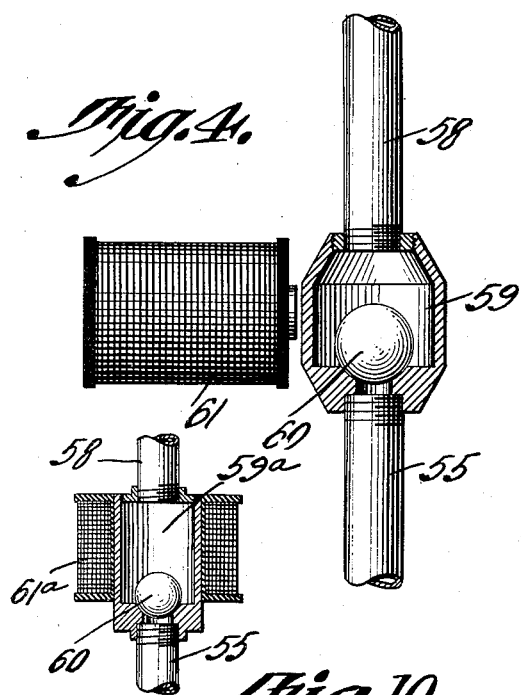
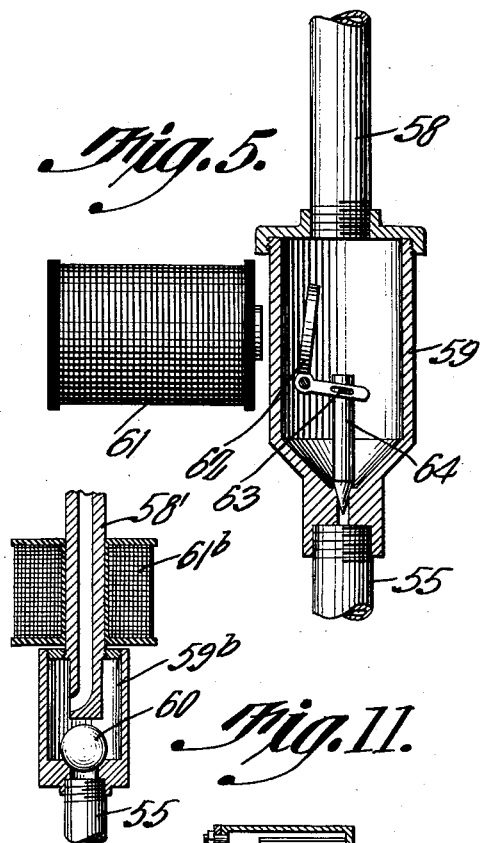
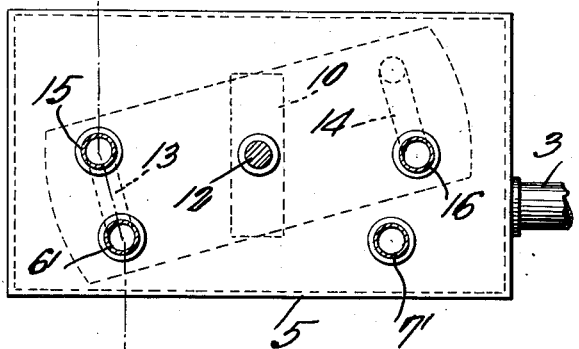
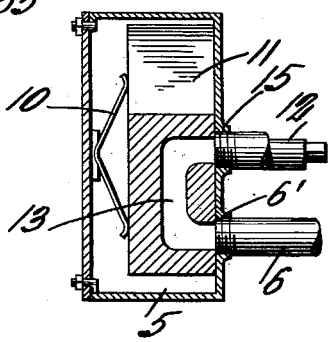
Witnesses
William H. Singleton, Inventor
by C. A. Snow & Co.,
Attorneys

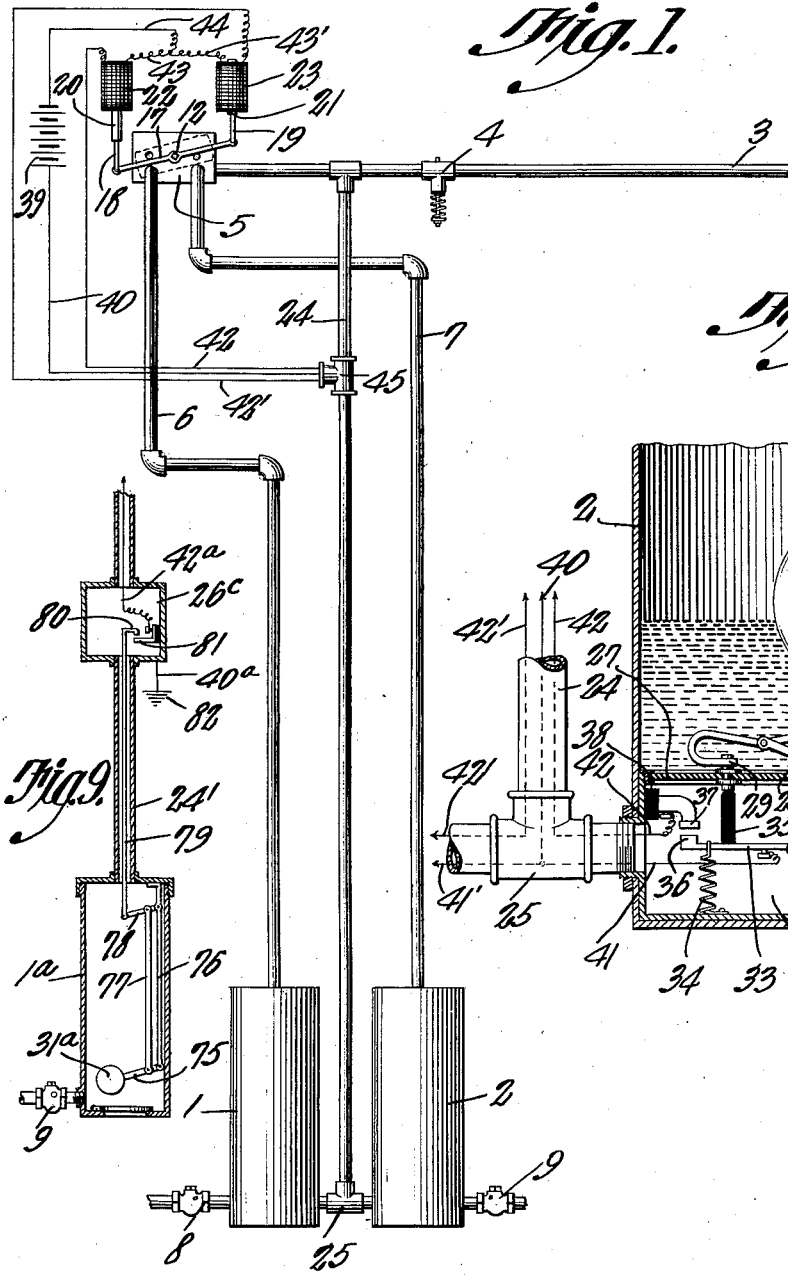

UNITED STATES PATENT OFFICE.

WILLIAM HENRY SINGLETON, OF MACON, GEORGIA.

PNEUMATIC WATER SYSTEM.

1,097,143.  Specification of Letters Patent.  Patented May 19, 1914.

Application filed May 13, 1913. Serial No. 767,489.

*To all whom it may concern:*

Be it known that I, WILLIAM H. SINGLETON, a citizen of the United States, residing at Macon, in the county of Bibb and State of Georgia, have invented a new and useful Pneumatic Water System, of which the following is a specification.

The present invention relates to improvements in pneumatic water systems, one object of the present invention being the provision of a system in which the air control for forcing the water to the desired point is actuated through a float controlled electrical mechanism, thus producing a system, in which the level of the water within the respective cylinders controls the actuation of the means for elevating the water from a filled cylinder, there being a plurality of even numbered cylinders disposed to be filled by gravity, the water being expelled therefrom by compressed air.

A further object of the present invention is the provision of means for controlling the flow of air in the respective cylinders for forcing the water therefrom, said means being disposed exteriorly of the well and in a readily accessible position for adjustment and repair.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a diagrammatic view illustrating the complete system, the source of compressed air not being shown. Fig. 2 is an enlarged detail sectional view through one of the cylinders showing the float actuated electrical control disposed therewithin. Fig. 3 is an enlarged detail sectional view of a pneumatic means for operating the air control valve and the auxiliary electrically controlled means for controlling the supply of air through the air valve, the electrical connections being shown in diagram. Fig. 4 is an enlarged detail sectional view of one form of air controlling valve. Fig. 5 is a similar view of another form of air controlling valve. Fig. 6 is an enlarged detail view of the main air controlling valve which is to be operated either pneumatically or electrically as found expedient. Fig. 7 is a section taken on line 7—7 of Fig. 6. Fig. 8 is a detail view showing what is termed the cut-out casing for preventing water of condensation in the air from affecting the electrical conductors disposed in the well. Fig. 9 is a sectional view showing a modified form of a float actuated switch and one of the pressure emptied cylinders of the system. Fig. 10 is a sectional view showing a solenoid construction for operating a ball valve. Fig. 11 is a view illustrating another form of solenoid construction for operating the ball valve.

Referring to the drawings, the numerals 1 and 2 designate the two water receiving cylinders to which water is fed by gravity, said cylinders being disposed preferably within the bottom of the well and submerged so that the water will flow therewithin, one of said cylinders being filled while the other is being emptied pneumatically, and vice versa.

The conduit 3 is led from a compressed air source (not shown) and is provided with the pressure relieving valve 4, said conduit being led through the main air control valve casing 5, a detail of which is clearly shown in Figs. 6 and 7. Led from the ports 6'—7' of the casing 5 are the two air supply conduits 6 and 7 respectively, which lead to the upper ends of the respective cylinders 1 and 2, so that at the proper time, air is supplied to the upper end of said cylinders to force the water therefrom to the respective check valve controlled conducting conduits 8 and 9, said conduits being led to the desired points, or point, as for instance the system within the house.

The valve member 11 is disposed partially within the casing 5, and consists of a rectangular block normally held properly seated by means of the spring 10, a stem 12 being provided to form the axis for the valve and the means by which the same is oscillated to bring the forward ends of the respective channels 13 and 14 into registration with the respective ports of the casing 5. When the valve ports are in the position as shown in Figs. 6 and 7, air enters through the conduit 3 into the casing 5, passing through the port 7' into the pipe 7 to the upper end of the cylinder 2, and as the channel 13 is forming a connecting medium between the conduit 6 and the exhaust conduit 15, the air within the cylinder 1, due to the rise of water therein through the check valve port in the bottom thereof and as shown at 2' in Fig. 2, is permitted to exhaust through the pipe 15 to the air and thus relieve any back pressure in the cylinder 1. When the valve 11 is operated to assume the other position, the air will enter through the conduit 3 into the casing 5 and through the port 6' and conduit 6 to the cylinder 1, the channel 14 at this time being in communication with the port 7' and the exhaust pipe 16, so that the air within the cylinder 2 due to the inrushing of the water through the check valve port 2' will be exhausted through the conduit 16, thus relieving any back pressure in the cylinder so that the same may be filled by gravity.

The valve member 11 may be oscillated by electrical means as shown in Fig. 2, or by the pneumatic control as shown in Fig. 3, electrical means being preferred where the valve is a light valve and is easily operated and the pneumatic means is preferred where the member 11 is heavier and is operating under a greater pressure, therefore needing a greater power to operate the same.

The electrical means as shown in Fig. 1, consists of the double lever 17 which is disposed upon the outer squared end of the valve stem 12, and is adapted to be oscillated through the respective rods 18 and 19 and the respective cores 20 and 21 of the solenoids 22 and 23, the solenoids being alternately energized, as will presently appear, automatically through the rise and fall of the water within the respective cylinders 1 and 2. A conduit 24 is led from the air supply pipe 3 and is connected by means of the coupling 25 to the respective cylinders 1 and 2, so as to form a conduit for the electrical conducting wires and also a means to admit air under pressure to the switch carrying casing 26 there being one of these disposed in each of the cylinders 1 and 2, as clearly shown in detail in Fig. 2. Disposed in the upper end of the casing 26 is a diaphragm 27, which is disposed to be normally held in the position as shown in Fig. 2 by means of the air pressure within the casing and to be depressed by means of the lever 29 which is connected to the diaphragm at one end, said lever being pivoted in the bracket 28 and through the link 30 to the float 31. By this means the lowering of the float 31 due to the fall of water therein and its discharge through the said valved conveying pipe 9, will permit of the elevation of the diaphragm 27 and consequently the pivoted contact lever 33, which is mounted in the lug 32 within the casing 26. The insulated pin 35 is carried by the contact lever 33 and is disposed in alinement to be engaged by the connection 29 of the diaphragm, so that under normal conditions the contacts 36 and 37 will be spaced apart and the circuit controlled thereby will be open. Upon the lowering of the float 31, and the consequent elevation of the diaphragm 27, the contact 36 will engage the contact 37 and close the circuit as will presently appear. The contact 37 is disposed in the bracket 38 carried within the casing 26, while the spring 34 is provided to force the contact 36 into engagement with the contact 37 when pressure is equalized upon both sides of the diaphragm 27.

When the circuit is closed at 36 and 37 in the casing 26 of the cylinder 2, the water has reached its lowest level within the cylinder 2 and has reached its highest level within the cylinder 1 and it is therefore desirable to check the flow of air to the cylinder 2 and to cause air to be directed into the cylinder 1 so that the water may be expelled from cylinder 1 while cylinder 2 is being filled by gravity.

The circuit controlled therefore and conducting air to the cylinder 1, includes the battery 39, the conductor 40, the conductor 41, the contact lever 33, the contact 36, the contact 37, the conductor 42, the solenoid 22, and the conductors 43 and 44. Thus the solenoid 22 is energized, elevating its core 20 and through the rod 18 shifting the valve 11 from the dotted line position in Fig. 1 to an opposite position so that the port 6' is uncovered by the valve member 11 and air is permitted to flow directly from the conduit 3 into the conduit 6 and thence to the upper end of the cylinder 1. When the water has been properly expelled from the cylinder 1, the float 31 will act in a similar manner, as shown in Fig. 2, elevating its diaphragm 27 to close the contacts 36 and 37 in the cylinder 1, while the contacts will be opened due to the rise of water in the cylinder 2 so that the circuit of the solenoid 22 will be opened, while the circuit of the solenoid 23 will be closed and cause the energization of the solenoid 23 to operate the valve member 11 to assume the position as shown in dotted lines in Fig. 1, or so that air will pass from the conduit 3 directly into the conduit 7 and into the cylinder 2 to expel the water therefrom. The circuit closed to perform this operation, consists of the batteries 39, the conductor 40, the conductor 41' leading to the lever 33 and contact 36 of the cylinder 1, the contact 37 thereof, the conductor 42', the solenoid 23, and conductors 43' and 44. Thus the core 21 of the solenoid 23 will be elevated to the position as before stated, in Fig. 1.

The coupling 45 is disposed in the conduit 24 exterior of the well and provides an air and water tight means through which the conductors 40, 42 and 42' are led into the conduit 24 below the coupling and out away therefrom to the batteries 39 and solenoids 22 and 23, and when it is desired the member 45 may be constructed as shown in Fig. 8, to constitute a casing 45', having the baffle plate 46 disposed in the lower end of the upper section of the conduit 24 so that the water of condensation in the air may be directed into the receptacle 47 so as to not affect the wires disposed within the casing 45' and led downwardly through the lower section of the conduit 24.

When it is desired to operate the valve member in the casing 5, pneumatically, an arrangement as shown in Fig. 3 is preferable, the double lever 17' which is connected to the stem 12' of the valve member 11' having connected to the respective ends thereof, the piston rods 48 and 49, which are disposed for sliding movement in their respective cylinders 50 and 50'. Mounted upon the lower end of the respective rods 48 and 49 are the diaphragm engaging heads 51 and 52 respectively, which are disposed to be actuated in their upward movement by the pneumatically actuated diaphragms 53 and 54 disposed in the respective casings 50 and 50'. In this construction the diaphragm 53 is controlled from air from the conduit 7ᵃ which corresponds to the conduit 7 of the before described mechanism, and the diaphragm 54 is controlled by air led from the conduit 6ᵃ which corresponds to the conduit 6 heretofore described.

In order to convey air from the conduit 7ᵃ to the lower end of the cylinder or casing 50 and subsequently elevate the diaphragm 53, a coupling 57 is connected to the conduit 7ᵃ and has led therefrom the conduit 58, which has connected thereto the valve casing 59 the conduit 55 being led from the valve casing and into the lower end of the cylinder or casing 50. By this means when the valve 60, or 64 of the construction shown in Figs. 4 and 5 respectively, are opened, air will flow from the conduit 7ᵃ into the lower end of the cylinder or casing 50 elevating the diaphragm 53 and consequently the head 51 and through the stem or rod 48 one end of the lever 17', so as to shift the valve member 11', from the dotted line position shown in Fig. 3 to the opposite position, the arm 74 controlled through the spring 75 being put in the position at the extreme left as shown in Fig. 3, assisting the lever 17 in the proper elevation so that the head 51 will pass upward to the upper end of the casing 50 and assume a similar position to the head 52 in the cylinder 50'.

A pneumatic control for the diaphragm 54 consists of a coupling 57', which is connected in the conduit 6ᵃ, and has a conduit 58' led thereaway from into the valve casing 59', the conduit 56 being connected to the valve casing 59' and to the lower end of the casing or cylinder 50', thus providing a means whereby air is supplied from the conduit 6ᵃ to the lower end of the casing or cylinder 50'.

Both of the respective valves 60 and 64 as clearly shown in Figs. 3, 4 and 5, are controlled electrically, the casings 59—59' being made of non-magnetic metal as, for instance, brass, while the small valve 60 as shown in Fig. 4 is made of iron or steel and is therefore attracted by its respective electro-magnets 61—61' to be elevated from its seat to permit of the passage of air from the respective conduits 6ᵃ—7ᵃ to operate the diaphragms 53 and 54, as before described. In the structure shown in Fig. 5, the armature 62 is constructed of steel or other magnetic metal, and is made in the form of a bell crank lever which is operably connected to the vertically movable needle valve 64 so that the same may be elevated when the armature is attracted by its electro-magnets 61—61' to open the valve and permit the passage of air to operate the respective diaphragms 53 and 54. In this form of the apparatus, it is desired that some means be provided to prevent sparking at contacts 36'—37' and 36ᵃ and 37ᵃ of the respective float actuated switches, and in order to do this, a conductor 65 is provided with the oppositely disposed branches 66, which are connected to and insulated from the lever 17' and carry contacts 67—67' for engagement with the contacts 68—68' disposed in the path thereof, as clearly illustrated in Fig. 3.

Assuming the parts to be in the position, as shown in Fig. 3, the air is flowing from the conduit 3ᵃ into the casing 5', and into the conduit 7ᵃ, and consequently forcing air out of the cylinder at the right (not shown), the contacts 67 and 68 being closed and the following circuits of the closure contacts 36'—37' and 36ᵃ and 37ᵃ to complete the circuit to operate the solenoid 61 or 61' and thus cause air to flow to operate the diaphragm 53 to shift the valve member 11' to the position opposite the dotted line position in Fig. 3. The circuit closed to perform this operation is as follows: the battery 73, the conductor 65, the branch conductors 66, the contacts 67 and 68, the conductors 69, the electro-magnet 61, the conductor 70, the contact 37', the contact 36', the conductors 71 and 72. This circuit is only closed a short time, as the opening of the valve 59 permits air to flow from the conduit 7ᵃ into the lower end of the cylinder 50, elevating the diaphragm 53 and the head 51, which through the stem 48 elevates the lever 17' and opens the contacts 67—68, the momentum or force of air being sufficient to throw the arm 74 to the left beyond the center line and the spring 75 will insure the movement of the valve member 11' so as to depress the stem 49 and head 52 upon the diaphragm 54, causing the same to assume the position similar to the head 51 and diaphragm 53. The contacts 36' and 37' and 67' and 68' at this time are connected and although the contacts 36'—37' are closed, no current is flowing through the solenoid 61 and as the valve member 11' has been thrown to the opposite position as shown in Fig. 3, air is conducted to the conduit 3ª into the conduit 6ª and into the cylinder containing the contacts 36ª and 37ª. When this mechanism has been operated due to the ejection of the water therefrom, the contacts 36ª and 37ª being brought together, the electro-magnet 61', is energized through the following circuit, and which includes the batteries 73, the conductor 65, the branch conductors 66, the contacts 67' and 68', the conductor 69', the electro-magnet 61', the conductor 70', the contact 36ª, the contact 37ª, the conductors 73 and 71', thus completing the circuit which operates the valve 59' and permits air to flow from the conduit 6ª into the lower end of the cylinder 50', operating the diaphragm 54 to start the elevation of the head 52 and the rod 49 so that the contacts 67'—68' are broken and the valve 11' through the action of the diaphragm 54 and spring 75 is moved to the position, as shown in Fig. 3, causing air to flow direct from the conduit 3ª through the conduit 7ª into the cylinder which has been just filled by gravity. The contacts 36ª—37ª remain closed until the water by gravity elevates its float control so that the contacts will be open. By this means it will be seen that the before described operation is controlled automatically by the water entering the respective cylinders 1 and 2, and that these cylinders will be filled and emptied alternately to supply the water.

Although the casing 26 is shown in the lower end of the respective cylinders 1 and 2, it is evident that the same may be disposed in the upper end above the water line, simply necessitating the reversal of the float levers to operate the diaphragm 27 to cause the opening and closing of the contacts 36—37, 36'—37' and 36ª—37ª. It is also evident that the main mechanism including the solenoids for operating the lever 17 or the air cylinders and the electrical control therefor operating the lever 17' may be disposed exteriorly of the well in such position to be readily adjusted and repaired and to be unaffected by the elements.

As shown in Fig. 10, the casing 59ª into which the conduit 58 leads and the conduit 55 is led thereaway from, is composed of brass or non-magnetic metal, the solenoid 61ª being disposed to surround the casing 59ª and thus when energized to elevate the ball valve 60, which being made of steel is attracted and in reality forms the core of the solenoid.

In the form shown in Fig. 11, the conduit 58' extends within the casing 59ᵇ and empties therewithin, said conduit being composed of a soft iron, so that when the solenoid 61ᵇ surrounding the same is energized, the ball valve 60 will be attracted to open the port leading into the conduit 55.

In the form of installation as shown in Fig. 9, the cylinder 1ª is constructed similarly to the cylinder 1, the air pipe 24' being led in the top thereof and having mounted for sliding movement therewithin, a rod 79 which carries the contact 80 in the path to engage the insulated contact 81 to which is connected lead 42ª of the circuit, the casing 26ᶜ or in fact any of the metal parts being grounded through the conduit 40ª to the ground at 82. In order to operate the contact 80 into and out of engagement with the contact 81, the float 31ª with its lever 75 is pivoted in the lower end of the supporting rod 76 within the cylinder 1ª, while the link 77 is connected to the lever 78 which in turn is connected to the lower end of the rod 79. Thus the contact box 26ᶜ is disposed above the level of the water and is not affected thereby as in the other case.

What is claimed is:

1. In a water system, the combination of two gravity filled submerged reservoirs, two check valved conduits, one to each reservoir, led therefrom, a compressed air supply conduit, two air conveying conduits, one to each reservoir, a valve casing interposed between the air supply conduit and the two air conveying conduits, a valve mounted in said casing for alternately connecting the two air conveying conduits to the air supply conduit, a double lever connected to the valve, pneumatically controlled means operably connected to the respective ends of the said lever, two conduits leading to the pneumatically operated means from the two air conveying conduits, a valve in each of said conduits, two floats, one mounted in each reservoir, two switches one controlled by each float, two electromotors for operating the valves of the pneumatically operated means, and two circuits including each a source of electrical energy, one switch of the reservoir, and one electromotor, whereby the valves are operated to alternately connect the two air conveying pipes to the air supply pipe.

2. In a water system, the combination of two gravity filled submerged reservoirs, two check valved conduits, one to each reservoir, led therefrom, a compressed air supply conduit, two air conveying conduits, one to each reservoir, a valve casing interposed between the air supply conduit and the two air conveying conduits, a valve mounted in said casing for alternately connecting the two air conveying conduits to the air supply conduit, a double lever connected to the valve, pneumatically controlled means operably connected to the respective ends of said lever, two conduits leading to the pneumatically operated means from the two air conveying conduits, a valve in each of said conduits, two floats, one mounted in each reservoir, two switches, one controlled by each float, two electromotors for operating the valves of the pneumatically operated means, and two circuits including each a source of electrical energy, one switch of the reservoir, and an electric motor, whereby the valves are operated to alternately connect the two air conveying pipes to the air supply pipe, and a spring operably connected to the lever for assisting the pneumatically actuated means in maintaining the lever in the respective positions.

3. In a water system, the combination of two gravity filled submerged reservoirs, two check valved conduits, one to each reservoir, two air conveying conduits, one to each reservoir, a valve casing interposed between the air supply conduit and the two air conveying conduits, a valve mounted in said casing for alternately connecting the two air conveying conduits to the air supply conduit, a double lever connected to the valve, two pneumatically controlled means one operably connected to each end of said lever, two conduits leading to the pneumatically operated means from the two air conveying conduits, a valve in each of said conduits, two floats, one mounted in each reservoir, two switches, one controlled by each float, two electromotors for operating the valves of the pneumatically operated means, and two circuits including each a source of electrical energy, one switch of the reservoir, and an electric motor, whereby the valves are operated to alternately connect the two air conveying pipes to the air supply pipe, and two pairs of coöperable contacts, one in each circuit, and connected to and carried in the path of the lever for opening the respective circuits after the movement of the valves.

In testimony that I claim the foregoing as my own, I have hereto affixed my signature in the presence of two witnesses.

WILLIAM HENRY SINGLETON.

Witnesses:
  O. H. CROCKETT,
  R. S. LEONARD.